US012410804B2

(12) United States Patent
Shen et al.

(10) Patent No.: US 12,410,804 B2
(45) Date of Patent: Sep. 9, 2025

(54) AIR BLOWING STRUCTURE AND FAN (71) Applicant: GREE ELECTRIC APPLIANCES, INC. OF ZHUHAI, Zhuhai (CN)

(72) Inventors: Zhiqiang Shen, Zhuhai (CN); Yong Wang, Zhuhai (CN); Shuang Feng, Zhuhai (CN); Jiyan Wang, Zhuhai (CN); Ruipeng Fan, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 0 days.

(21) Appl. No.: 18/258,479

(22) PCT Filed: Nov. 5, 2021

(86) PCT No.: PCT/CN2021/129028
§ 371 (c)(1),
(2) Date: Jun. 20, 2023

(87) PCT Pub. No.: WO2022/160844
PCT Pub. Date: Aug. 4, 2022

(65) Prior Publication Data
US 2024/0035482 A1 Feb. 1, 2024

(30) Foreign Application Priority Data
Jan. 26, 2021 (CN) .......................... 202110104492.9

(51) Int. Cl.
*F04D 25/08* (2006.01)
*F04D 25/06* (2006.01)
(Continued)

(52) U.S. Cl.
CPC ............. *F04D 25/08* (2013.01); *F04D 25/06* (2013.01); *F04D 25/0693* (2013.01);
(Continued)

(58) Field of Classification Search
CPC .. F04D 25/06; F04D 25/08; F04D 25/10–105; F04D 29/644; F04D 29/703;
(Continued)

(56) References Cited

U.S. PATENT DOCUMENTS 2,722,374 A * 11/1955 King ..................... F04D 29/646
416/110
2,725,184 A * 11/1955 Mucci ................... F04D 25/105
310/40.5
(Continued)

FOREIGN PATENT DOCUMENTS

| CN | 101839249 A | * | 9/2010 |
| CN | 101846090 A | * | 9/2010 |

(Continued)

OTHER PUBLICATIONS

Holmes HAPF624R-UC 12 Inch Blizzard Remote Control Power Fan with Rotating Grill; https://web.archive.org/web/20180320202445/ https://www.amazon.com/Holmes-HAPF624R-UC-Blizzard-Control-Rotating/dp/B00I8Q307S#customer Reviews (Year: 2018).*

(Continued)

*Primary Examiner* — Alexander B Comley
(74) *Attorney, Agent, or Firm* — Christensen O'Connor Johnson Kindness PLLC (57) ABSTRACT

The present disclosure relates to a blowing structure and a fan. The blowing structure includes a main body, a base, a control panel, a second drive member, and a first drive member. The main body is provided with a blowing channel, and the main body is rotatably connected to the base. The control panel is disposed on the main body. The second drive member is disposed in the blowing channel. The first drive member is connected to the main body, and the first drive member is configured to adjust an angle of rotation of the main body with respect to the base. The control panel is (Continued)

electrically connected to the second drive member and the first drive member.

20 Claims, 5 Drawing Sheets (51) Int. Cl.
  *F04D 29/52* (2006.01)
  *F04D 29/64* (2006.01)
  *F04D 29/70* (2006.01)
(52) U.S. Cl.
  CPC ......... *F04D 29/522* (2013.01); *F04D 29/644* (2013.01); *F04D 29/703* (2013.01)
(58) Field of Classification Search
  CPC ............... F04D 25/0693; F04D 29/403; F04D 29/52–522; F04D 29/545
  See application file for complete search history.

(56) References Cited

U.S. PATENT DOCUMENTS

| | | | | |
|---|---|---|---|---|
| 2,811,304 | A * | 10/1957 | Russer | F04D 25/105 416/100 |
| 2,813,673 | A * | 11/1957 | Smith | F04D 25/105 403/312 |
| 2,836,350 | A * | 5/1958 | Tateishi | F04D 25/105 415/125 |
| 2,838,229 | A * | 6/1958 | Belanger | F04D 25/105 188/313 |
| 5,310,313 | A * | 5/1994 | Chen | F04D 25/105 416/100 |
| 5,370,500 | A * | 12/1994 | Thompson | F04D 29/601 248/676 |
| 5,411,371 | A * | 5/1995 | Chen | F04D 25/105 416/100 |
| 2009/0026850 | A1* | 1/2009 | Fu | F04D 25/105 310/40.5 |
| 2010/0003149 | A1* | 1/2010 | Nelson | F04D 29/703 415/121.2 |
| 2015/0226224 | A1 | 8/2015 | De Filippis | |
| 2017/0045246 | A1* | 2/2017 | Kaleta | F24F 7/007 |
| 2019/0134247 | A1* | 5/2019 | Oligie | F04D 29/705 |
| 2020/0208871 | A1* | 7/2020 | Yamamoto | F04D 29/522 |

FOREIGN PATENT DOCUMENTS

| | | | | |
|---|---|---|---|---|
| CN | 102155420 | A | 8/2011 | |
| CN | 204267334 | U | 4/2015 | |
| CN | 106015063 | A * | 10/2016 | |
| CN | 106837832 | A * | 6/2017 | |
| CN | 107514370 | A * | 12/2017 | |
| CN | 107725440 | A | 2/2018 | |
| CN | 207420934 | U | 5/2018 | |
| CN | 108119379 | A * | 6/2018 | .......... F04D 25/105 |
| CN | 207598543 | U * | 7/2018 | |
| CN | 108843599 | A | 11/2018 | |
| CN | 109236708 | A * | 1/2019 | .......... F04D 25/105 |
| CN | 209012102 | U | 6/2019 | |
| CN | 211174725 | U | 8/2020 | |
| CN | 112761981 | A | 5/2021 | |
| CN | 214499488 | U | 10/2021 | |
| EP | 0017869 | A1 | 10/1980 | |
| GB | 2550588 | A * | 11/2017 | ............. F04D 25/08 |
| JP | 1992043895 | A | 2/1992 | |
| JP | 2020200806 | A * | 12/2020 | |
| JP | 20200200806 | A | 12/2020 | |
| WO | WO-2014045179 | A1 * | 3/2014 | ................ F01P 5/02 |

OTHER PUBLICATIONS

International Search Report mailed Feb. 10, 2022, issued in corresponding International Patent Application No. PCT/CN2021/129028, filed Nov. 5, 2021, 6 pages.

International Written Opinion mailed Feb. 10, 2022, issued in corresponding International Patent Application No. PCT/CN2021/129028, filed Nov. 5, 2021, 6 pages.

Chinese First Office Action mailed Mar. 24, 2022, issued in related Chinese Application No. 202122993773.2, filed Nov. 30, 2021, 3 pages.

Extended European Search Report mailed Jun. 6, 2024, in corresponding European Application No. 21922434.2, filed Nov. 5, 2021, 6 pages.

Notice of Reasons for Refusal drafted Apr. 19, 2024, and mailed May 7, 2024, issued in corresponding Japanese Application No. 2023-534729, filed Nov. 5, 2021, 8 pages.

* cited by examiner

AIR BLOWING STRUCTURE AND FAN

This application is a National Stage of International Application No. PCT/CN2021/129028, filed Nov. 5, 2021, which claims priority to Chinese patent application No. 202110104492.9, entitled "Air Blowing Structure and Fan", filed on Jan. 26, 2021, the disclosures of which are hereby incorporated by reference in their entirety.

TECHNICAL FIELD

The present disclosure relates to the technical field of fans, and particularly relates to a blowing structure and a fan.

BACKGROUND

With the development of science and technology, various new refrigeration and cooling devices are emerging. However, as a device capable of increasing air flow, a fan still plays an important role in the field of home appliances due to its low price and low energy consumption. The function display and operations of fans on the market are mostly on the chassis or base, which usually requires the user to bend or squat down to operate, which results in inconvenience in operation and observation of the fans. Since the motors inside the fan are all arranged near the head and the wires need to pass through the connections of different parts of the fan, the wire routing is long and complicated.

SUMMARY

In view of this, the present disclosure aims to provide a blowing structure and a fan that can simplify the wire routing and reduce the wire length.

The technical solutions are as follows:

A blowing structure includes a main body, a base, a control panel, and a first drive member. The main body is provided with a blowing channel, and the main body is rotatably connected to the base. The control panel is disposed on the main body. The first drive member is connected to the main body, and the first drive member is configured to adjust an angle of rotation of the main body with respect to the base. The control panel is electrically connected to the first drive member.

In an embodiment, the blowing structure further includes a second drive member. The second drive member is disposed in the blowing channel, and the control panel is electrically connected to the second drive member.

In the embodiments of the blowing structure, the control panel is disposed on the main body instead of on the base. When a user needs to operate the blowing structure, such as adjusting its function, and to observe the blowing structure, the user can directly operate on the control panel of the main body. Compared with the case in which the control panel is disposed on the base, the user does not need to bend or squat, and the operation and observation are more convenient, so that the user experience can be improved. Since the control panel is disposed on the main body, while the second drive member is disposed in a setting area of the main body, and the first drive member is connected to the main body, the conducting wires, which are electrically connected between the control panel, and the second drive member or the first drive member, are routed only in the main body, and do not need to pass through the connection between the main body and the base, so that the length of these wires is reduced, the wire routing is simplified, and the production and assembly costs can be reduced.

In an embodiment, the blowing structure further includes: a first conducting wire, a supporting member, and a wire routing channel Two ends of the first conducting wire are electrically connected to the second drive member and the control panel, respectively. The supporting member is disposed between the second drive member and an inner wall of the blowing channel Two ends of the supporting member are connected to the second drive member and the inner wall of the main body defining the blowing channel, respectively. The wire routing channel is defined in the supporting member. The first conducting wire extends through the wire routing channel.

In an embodiment, the blowing structure further includes a second conducting wire. Two ends of the second conducting wire are electrically connected to the first drive member and the control panel, respectively. The first conducting wire and the second conducting wire are disposed on two sides of the control panel, respectively.

In an embodiment, a guide groove and/or a buckle body are/is disposed in the main body to fix the first conducting wire.

In an embodiment, the blowing structure further includes a front guard and a rear guard, disposed at an air inlet and an air outlet of the blowing channel, respectively. The front guard is provided with a first air vent. The rear guard is provided with a second air vent. A shape of the first air vent matches a shape of the second air vent.

In an embodiment, a connecting member is disposed between the second drive member and an inner wall of the blowing channel, and the connecting member matches the shape of the first air vent or the second air vent.

In an embodiment, the connecting member is spiral-shaped.

In an embodiment, the blowing structure further includes a third drive member and a foundation. The base is rotatably coupled with the foundation, and the third drive member is configured to drive the base to rotate relative to the foundation.

In an embodiment, the blowing structure further includes a third conducting wire. A wire passing channel is defined at a connection between the base and the main body. The third conducting wire extends through the wire passing channel. One end of the third conducting wire is arranged in the main body and electrically connected to the control panel, and another end of the third conducting wire is arranged in the base and electrically connected to the third drive member.

In an embodiment, the base includes a first sub-body and a second sub-body spaced from each other. The first sub-body and the second sub-body are rotatably connected to two sides of the main body, respectively. The first drive member is disposed between the first sub-body and the main body. The wire passing channel is disposed at a connection between the second sub-body and the main body.

In an embodiment, the blowing structure further includes a first adapter and a second adapter. The first adapter is connected to the main body. The second adapter is connected to the second sub-body. The second adapter passes through the first adapter and is rotatably coupled with the first adapter. The wire passing channel is located in the second adapter.

In an embodiment, the blowing structure further includes a third adapter and a fourth adapter. The fourth adapter is connected to the first sub-body. The fourth adapter passes through the third adapter and is rotatably coupled with the third adapter. The third adapter is connected to the first drive member. The first drive member is connected to the main body, and an output shaft of the first drive member is connected to the fourth adapter.

In an embodiment, the third drive member is disposed in an end of the base adjacent to the foundation, and an output shaft of the third drive member is connected to the foundation.

In an embodiment, the main body includes an air channel member and a housing, which are connected together. The air channel member surrounds and defines the blowing channel. The housing is disposed on a side of the air channel member away from the blowing channel A mounting space is formed between the housing and the air channel member, and the control panel includes a controller, which is disposed in the mounting space.

In an embodiment, the housing includes an upper housing and a lower housing, and the control panel is disposed at the upper housing.

In an embodiment, the control panel further includes a remote control receiver electrically connected to the controller, and the housing or the air channel member is provided with a receiving port corresponding to the remote control receiver.

In an embodiment, the control panel includes a key, and the housing is provided with a passing port corresponding to the key; and/or the control panel includes a touch control member electrically connected to the controller, and the touch control member is disposed on the housing.

In an embodiment, the control panel includes an indicator light electrically connected to the controller, and the housing is provided with a relief port corresponding to the indicator light; and/or the control panel includes a display screen electrically connected to the controller, and the display screen is disposed on the housing.

A fan is provided, which includes any of the blowing structures described above.

In the embodiments of the fan, the control panel is disposed on the main body instead of on the base. When a user needs to operate the blowing structure, such as adjusting its function, and to observe the blowing structure, the user can directly operate on the control panel of the main body. Compared with the case in which the control panel is provided on the base, the user does not need to bend or squat, and the operation and observation are more convenient, so that the user experience can be improved. Since the control panel is disposed on the main body, while the second drive member is disposed in a setting area of the main body, and the first drive member is connected to the main body, the wires, which are electrically connected between the control panel, and the second drive member or the first drive member, are routed only in the main body, and do not need to pass through the connection between the main body and the base, so that the length of these wires is reduced, the wire routing is simplified, and the production and assembly costs can be reduced.

BRIEF DESCRIPTION OF THE DRAWINGS

The accompanying drawings that constitute part of the present disclosure are intended to provide a further understanding of the present disclosure. The illustrative embodiments of the present disclosure as well as the description thereof are provided to explain the present disclosure, and do not constitute improper limitations to the present disclosure.

In order to more clearly illustrate the technical solutions in the embodiments of the present disclosure, a brief description will be given below for the drawings referred in the description of the embodiments. Obviously, the drawings in the following description merely show some of the embodiments of the present disclosure. For those of ordinary skill in the art, other drawings may also be obtained according to these drawings without any creative work.

DESCRIPTION OF REFERENCE SIGNS 100, main body; 101, blowing channel; 110a, supporting member; 110b, connecting member; 111, wire routing channel; 120, air channel member; 121, receiving port; 130, housing; 131, upper housing; 132, lower housing; 200, base; 201, wire passing channel; 210, first sub-body; 220, second sub-body; 230, first adapter; 240, second adapter; 250, third adapter; 260, fourth adapter; 300, control panel; 310, controller; 320, remote control receiver; 330, indicator light; 410, second drive member; 420, first drive member; 430, first conducting wire; 431, guide groove and/or buckle body: 440, second conducting wire; 450, third drive member; 460, third conducting wire; 510, front guard; 511, first air vent; 512, mating port; 520, rear guard; 521, second air vent; 600, foundation.

DETAILED DESCRIPTION

In order to make the objectives, features, and advantages of the present disclosure more apparent and understandable, the specific implementations of the present disclosure will be explained in detail below in conjunction with the accompanying drawings. In the following description, numerous specific details are set forth in order to facilitate a thorough understanding of the present disclosure. However, the present disclosure can be implemented in many other ways different from those described herein, and those skilled in the art can make similar modifications without departing from the spirit of the disclosure, so that the present disclosure is not limited to the specific embodiments disclosed below.

Figure 1:
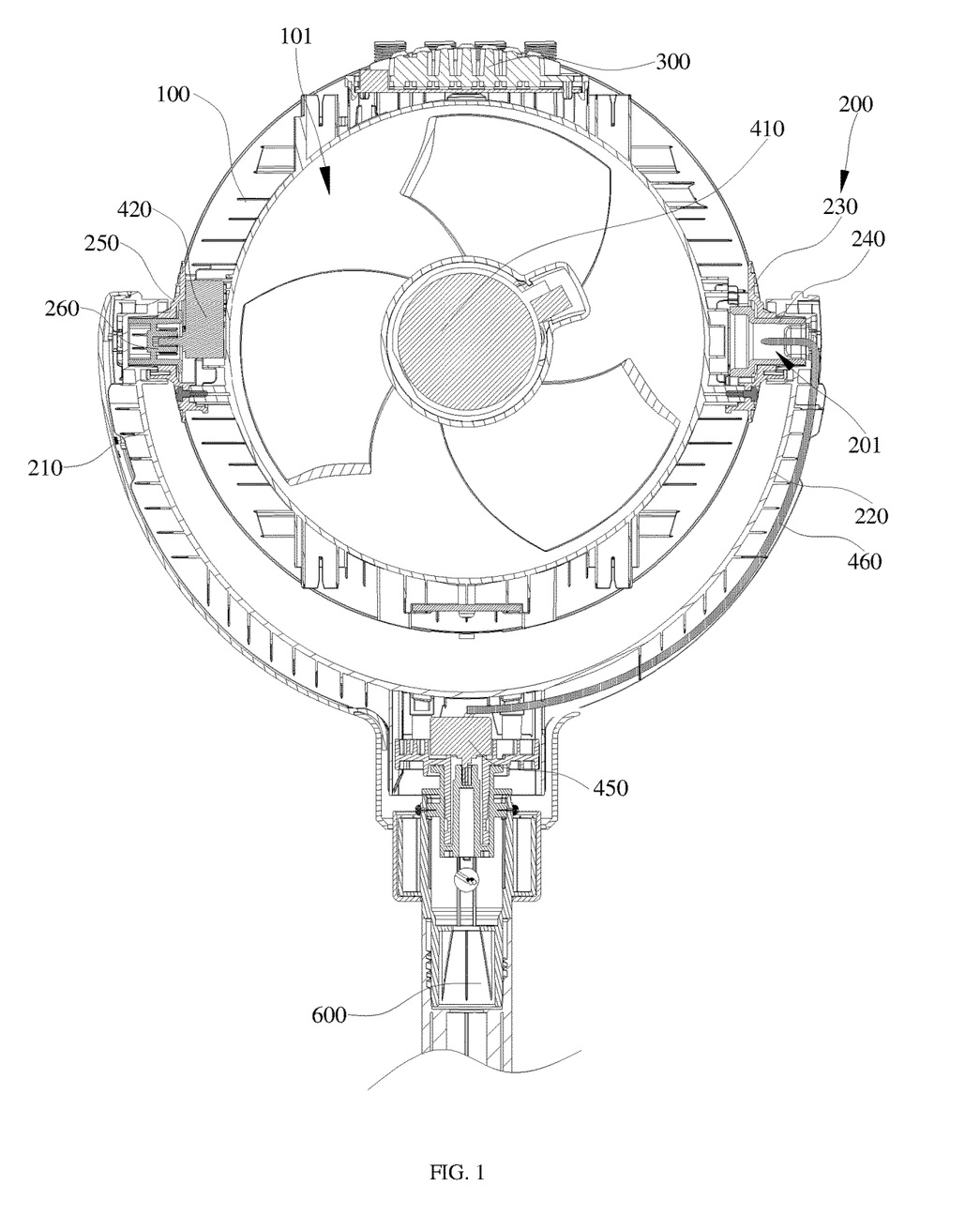
FIG. 1 is a cross-sectional view of a blowing structure according to an embodiment of the present disclosure.
Figure 2:
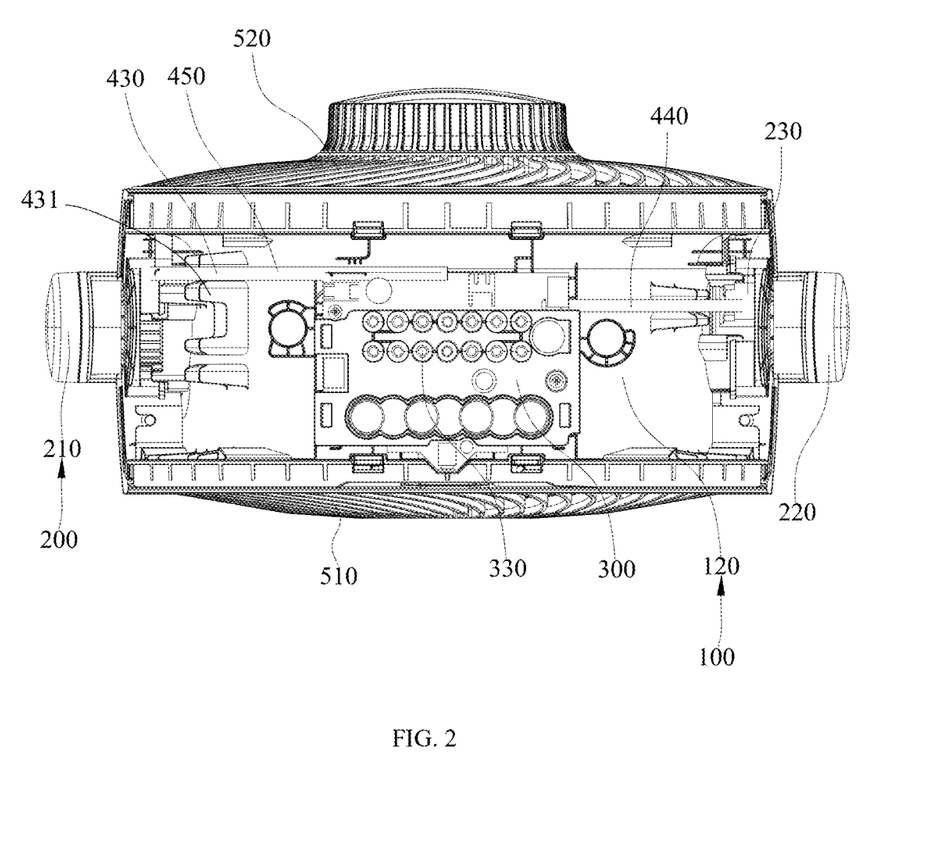
FIG. 2 is a top view of a part of the blowing structure according to an embodiment of the present disclosure.

As shown in FIG. 1 and FIG. 2, an embodiment of a blowing structure includes a main body 100, a base 200, a control panel 300, and a first drive member 420. The main body 100 is provided with a blowing channel 101, and the main body 100 is rotatably connected to the base 200. The control panel 300 is disposed on the main body 100. The first drive member 420 is connected to the main body 100, and the first drive member 420 is configured to adjust an angle of rotation of the main body 100 with respect to the base 200. The control panel 300 is electrically connected to the first drive member 420.

In the embodiments of the blowing structure, the control panel 300 is disposed on the main body 100 instead of on the base 200. When a user needs to operate the blowing structure, such as adjusting its function, and to observe the blowing structure, the user can directly operate on the control panel 300 of the main body 100. Compared with the case in which the control panel 300 is disposed on the base 200, the user does not need to bend or squat, and the operation and observation are more convenient, so that the user experience can be improved. In addition, since the control panel 300 is disposed on the main body 100, and the first drive member 420 is connected to the main body 100, the conducting wire which is electrically connected between the control panel 300 and the first drive member 420 is routed only in the main body 100, and does not need to pass through the connection between the main body 100 and the base 200, so that the length of the wire is reduced, the wire routing is simplified, and the production and assembly costs can be reduced.

In an embodiment, the blowing structure further includes a second drive member. The second drive member is disposed in the blowing channel, and the control panel is electrically connected to the second drive member. Since the second drive member 410 is disposed in a setting area of the main body 100, the conducting wire which is electrically connected between the control panel 300 and the second drive member 410 is routed only in the main body 100, and does not need to pass through the connection between the main body 100 and the base 200, so that the length of the wire is reduced, the wire routing is simplified, and the production and assembly costs can be reduced.

In an embodiment, the control panel 300 may only include an operation zone for function adjusting operations, or only include a display zone for displaying status, or include both the operation zone and the display zone at the same time.

In an embodiment, the control panel 300 is partially disposed on the outer peripheral surface of the main body 100. In this case, the control panel 300 partially extends out from the outer peripheral surface of the main body 100, making it convenient for users to operate or observe.

In other embodiments, the control panel 300 can alternatively be disposed at other positions of the main body 100. For example, the main body 100 includes a first end face and a second end face. An air inlet and an air outlet of the blowing channel 101 are respectively disposed on the first end face and the second end face. The control panel 300 can also be disposed on the first end face or the second end face. In this case, when the blowing structure is relatively tall overall, the control panel 300 can directly face the user. The user does not need to move such as lower his/her head, bend over, or squat down, making it convenient for observation and operation.

Figure 3:
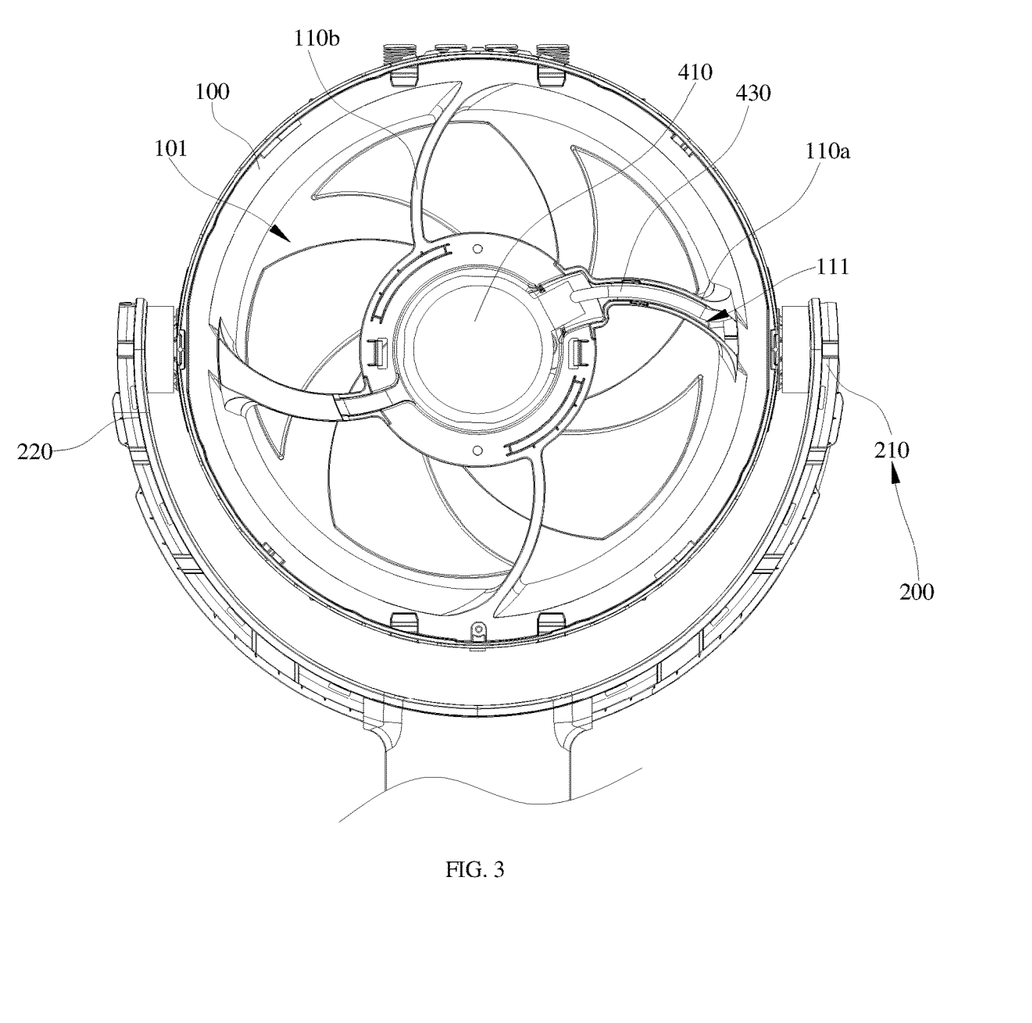
FIG. 3 is a rear view of a part of the blowing structure according to an embodiment of the present disclosure.

In an embodiment, as shown in FIGS. 1 to 3, the blowing structure further includes a first conducting wire 430. Two ends of the first conducting wire 430 are electrically connected to the second drive member 410 and the control panel 300, respectively. A supporting member 110a is disposed between the second drive member 410 and an inner wall of the main body 100 defining the blowing channel 101. Two ends of the supporting member 110a are connected to the second drive member 410 and the inner wall of the main body 100 defining the blowing channel 101, respectively. A wire routing channel 111 is defined in the supporting member 110a, and the first conducting wire 430 extends through the wire routing channel 111. Since the control panel 300 is disposed on the main body 100, the first conducting wire 430 connected between the control panel 300 and the second drive member 410 is routed only on the main body 100, and the first conducting wire 430 passes through the inside of the supporting member 110a, so that there is no position interference between the first conducting wire 430 and other elements in the blowing channel 101. The wire routing of the first conducting wire 430 in the blowing structure is relatively simple and is convenient for assembling. On a condition that a relative rotation between the main body 100 and the base 200 exists, the first conducting wire 430 is not affected by such rotation, that is the first conducting wire 430 is not twisted or bent, so that the service life of the first conducting wire 430 can be prolonged.

In an embodiment, the second drive member 410 is an electric motor.

In other embodiments, the first conducting wire 430 can also be bound to the supporting member 110a such that the first conducting wire 430 extends along the supporting member 110a to the second drive member 410.

In an embodiment, as shown in FIGS. 1 to 3, the blowing structure further includes a second conducting wire 440. Two ends of the second conducting wire 440 are electrically connected to the first drive member 420 and the control panel 300, respectively. The first conducting wire 430 and the second conducting wire 440 are disposed on two sides of the control panel 300, respectively. By arranging the first conducting wire 430 and the second conducting wire 440 on two sides of the control panel 300, respectively, it can facilitate wire routing and prevent the entanglement of different wires from affecting normal use.

In an embodiment, a guide groove and/or a buckle body 431 are/is disposed within the main body 100 to fix the first conducting wire 430. The first conducting wire 430 can be fixed and guided by the guide groove and/or the buckle body 431, so that the displacement of the first conducting wire 430 is prevented, and the installation of the first conducting wire 430 is facilitated.

In an embodiment, the buckle body 431 can be two arcuate members arranged at intervals. The arcuate members are made of an elastic deformation material. The two arcuate members form a clamping space therebetween, and the first conducting wire 430 can be pressed in between the two arcuate members, so that the first conducting wire 430 is fixed by the elastic deformation of the two arcuate members.

Figure 4:
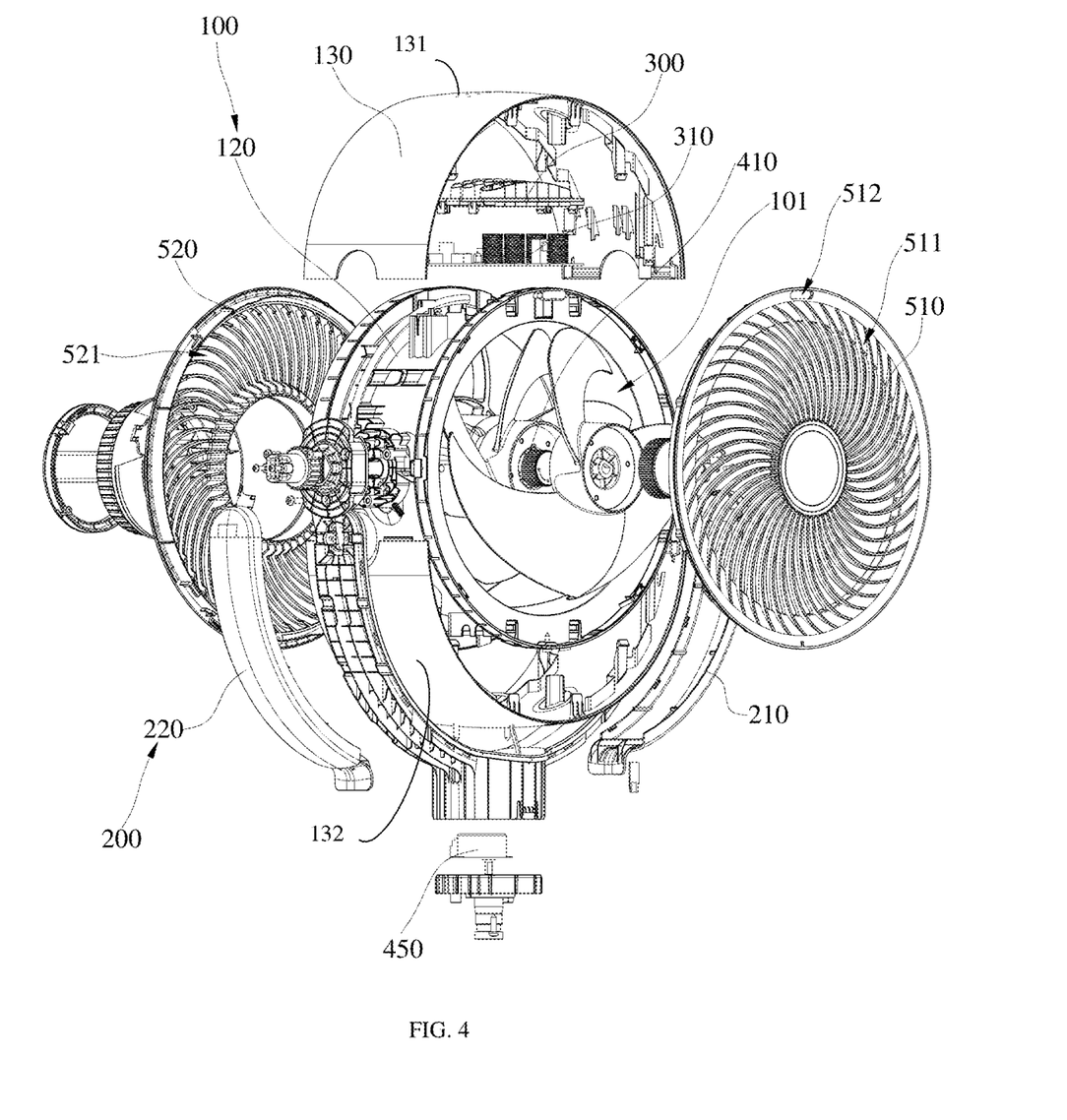
FIG. 4 is an exploded view of a part of the blowing structure according to an embodiment of the present disclosure.

In an embodiment, as shown in FIG. 4, the blowing structure further includes a front guard 510 and a rear guard 520. The front guard 510 and the rear guard 520 are disposed at the air inlet and the air outlet of the blowing channel 101, respectively. The front guard 510 is provided with a first air vent 511, and the rear guard 520 is provided with a second air vent 521. The shape of the first air vent 511 matches the shape of the second air vent 521. The first air vent 511 of the front guard 510 and the second air vent 521 of the rear guard 520 are designed to have the same or similar shapes, so that the front guard 510 and the rear guard 520 are consistent, the permeability during ventilation can be increased, the noise during operation of the whole machine can be reduced, and the user experience can be improved.

In an embodiment, as shown in FIG. 3 and FIG. 4, a connecting member 110b is disposed between the second drive member 410 and the inner wall of the main body 100 defining the blowing channel 101, and the connecting member 110b matches the shape of the first air vent 511 or the second air vent 521. The connecting member 110b, and the first air vent 511 or the second air vent 521 are designed to have the same or similar shape, so that the obstruction induced by the connecting member 110b is relatively small when the air flows from the second air vent 521 to the first air vent 511, the permeability of the air channel can be improved, the noise during operation of the whole machine can be further reduced, and the user experience can be further improved.

In an embodiment, as shown in FIG. 3 and FIG. 4, the connecting member 110b is spiral-shaped. In this case, the first air vent 511 and the second air vent 521 are also spiral-shaped, which is the same as or similar to the connecting member 110b. The airflow is less obstructed when passing through the front guard 510 such as a front mesh cover, the connecting member 110b and the rear guard 520 such as a rear mesh cover, and the airflow acts in a wider range after being discharged from the air channel member 120, and is less noisy in operation.

As shown in FIG. 3 and FIG. 4, the "connecting member 110b" and the "supporting member 110a" can be the same member or different members. When the connecting member 110b and the supporting member 110a are different members, the connecting member 110b and the supporting member 110a are the same or similar in shape and size, except that the wire routing channel 111 is disposed in the supporting member 110a for the first conducting wire 430 to pass therethrough.

In an embodiment, the front guard 510 and the rear guard 520 are removably connected to the main body 100, making it easy to assemble and maintain.

Specifically, the front guard 510 includes an outer ring member, a center member, and a plurality of strut members. Two ends of the strut members are connected to the center member and the outer ring member, respectively. The strut members are disposed at intervals. The first air vent 511 is formed between two adjacent strut members. Taking the cross-section of the blowing channel 101 as a projection plane, the shapes of the projections of the first air vent 511 and the connecting member 110b on the projection surface are the same or set proportionally. The structure of the rear guard 520 is the same as that of the front guard 510, and the ventilation of the blowing channel 101 can be improved.

In an embodiment, as shown in FIGS. 1 and 4, the blowing structure further includes a third drive member 450 and a foundation 600. The base 200 is rotatably coupled with the foundation 600, and the third drive member 450 is configured to drive the base 200 to rotate relative to the foundation 600. The third drive member 450 can rotate the base 200 with respect to the foundation 600, that is, can rotate the main body 100 with respect to the foundation 600, so as to control the left and right swinging angles of the main body 100.

In an embodiment, the portion rotatably coupling the base 200 with the foundation 600 is spaced 20 mm to 150 mm from the main body 100. In other embodiments, the portion rotatably coupling the base 200 with the foundation 600 can also be spaced in other distance from the main body 100, depending on the actual situation.

In an embodiment, as shown in FIG. 1, FIG. 2, and FIG. 4, the blowing structure further includes a third conducting wire 460. A wire passing channel 201 is disposed at the connection between the base 200 and the main body 100. The third conducting wire 460 passes through the wire passing channel 201. One end of the third conducting wire 460 is arranged in the main body 100 and electrically connected to the control panel 300. The other end of the third conducting wire 460 is arranged in the base 200 and electrically connected to the third drive member 450. The third drive member 450 can be controlled by the control panel 300. In this case, the third conducting wire 460 is routed inside the base 200 and the main body 100, so that the third conducting wire 460 is not exposed externally. It can prevent the third conducting wire 460 from coming into contact with the outside, which may affect its service life.

In other embodiments, the blowing structure can also include another control structure for separately controlling the third drive member 450. For example, another control panel 300 or a remote control receiving device is disposed on the base 200 for controlling the third drive member 450, in which case the routing of the third conducting wire 460 can be only in the base 200.

In an embodiment, as shown in FIG. 1, FIG. 2, and FIG. 4, the base 200 includes a first sub-body 210 and a second sub-body 220 spaced from each other. The first sub-body 210 and the second sub-body 220 are rotatably connected to two sides of the main body 100, respectively. The first drive member 420 is disposed between the first sub-body 210 and the main body 100. The wire passing channel 201 is disposed at the connection between the second sub-body 220 and the main body 100. The angle of rotation of the main body 100 with respect to the base 200 can be controlled by the first drive member 420, so that the pitch angle of the main body 100 can be adjusted. In addition, the first sub-body 210 and the second sub-body 220 together support the main body 100, so as to reduce the load-bearing pressure of any one of the sub-bodies, and make the main body 100 more stable. Since the first drive member 420 is disposed at the connection between the first sub-body 210 and the main body 100, and the wire passing channel 201 is disposed at the connection between the second sub-body 220 and the main body 100, the third conducting wire 460 and the first drive member 420 can be arranged separately, so that position interference between them is prevented, and difficulty of the wire routing is reduced.

In an embodiment, as shown in FIG. 1, FIG. 2, and FIG. 4, the blowing structure further includes a first adapter 230 and a second adapter 240. The first adapter 230 is connected to the main body 100. The second adapter 240 is connected to the second sub-body 220. The second adapter 240 passes through the first adapter 230 and is rotatably coupled with the first adapter 230. The wire passing channel 201 is located in the second adapter 240. With the cooperation of the first adapter 230 and the second adapter 240, the direct contact between the main body 100 and the base 200 is reduced, and the assembly between the main body 100 and the base 200 is facilitated. Since the second sub-body 220 is connected to the second adapter 240 and the wire passing channel 201 is located in the second adapter 240, the third conducting wire 460 can smoothly pass through the connection between the main body 100 and the base 200. When there is a relative rotation between the second sub-body 220 and the main body 100, the third conducting wire 460 does not in contact with the first adapter 230, so that the third conducting wire 460 can be prevented from being worn, and the service life of the third conducting wire 460 can be prolonged.

In an embodiment, the end of the second adapter 240 adjacent to the main body 100 is the first end. The first end partially extends out from the first adapter 230 to facilitate direct access of the third conducting wire 460 to the wire passing channel 201 without contact with the first adapter 230, thereby reducing friction.

In an embodiment, the end of the second adapter 240 adjacent to the second sub-body 220 is the second end. The second end partially extends out from the first adapter 230. The second sub-body 220 is provided with a first mounting groove on the side adjacent to the main body 100. The part of the second end extending out from the first adapter 230 extends into the first mounting groove and is connected to the second sub-body 220. The bottom wall of the first mounting groove is provided with a passing hole communicating with the wire passing channel 201. The second sub-body 220 is provided with a cavity communicating with the passing hole. In this case, the third conducting wire 460 can conveniently pass through the wire passing channel 201 and the passing hole, and directly enter the cavity of the second sub-body 220 for easy connection to the third drive member 450.

In an embodiment, the second conducting wire 440 and the third conducting wire 460 are also disposed on two sides of the control panel 300, respectively.

In an embodiment, the second conducting wire 440 and the third conducting wire 460 are combined into a strand of wires when led out from the control panel 300 and separated after extending for a certain distance, which can prevent entanglement of the second conducting wire 440 and the third conducting wire 460 from affecting their usage.

In an embodiment, the first drive member 420 is a pitch angle control motor.

In an embodiment, a guide groove and/or a buckle body are/is also disposed within the main body 100 to fix the third conducting wire 460 and the second conducting wire 440.

In an embodiment, as shown in FIG. 1, FIG. 2, and FIG. 4, the blowing structure further includes a third adapter 250 and a fourth adapter 260. The fourth adapter 260 is connected to the first sub-body 210. The fourth adapter 260 passes through the third adapter 250 and is rotatably coupled with the third adapter 250. The third adapter 250 is connected to the first drive member 420. The first drive member 420 is connected to the main body 100. The output shaft of the first drive member 420 is connected to the fourth adapter 260. The third adapter 250 and the fourth adapter 260 facilitate the assembly between the first sub-body 210 and the main body 100, and reduce the direct contact between the first sub-body 210 and the main body 100. The fourth adapter 260 is driven to rotate by the output shaft of the first drive member 420, so that the first sub-body 210 is rotated relative to the main body 100.

In an embodiment, the first sub-body 210 is provided with a second mounting groove on the side adjacent to the main body 100. One end of the fourth adapter 260 extends out from the third adapter 250 and extends into the second mounting groove, so as to ensure that the fourth adapter 260 is connected to the first sub-body 210 stably.

In an embodiment, as shown in FIG. 1, FIG. 2, and FIG. 4, the third drive member 450 is disposed in the end of the base 200 adjacent to the foundation 600. The output shaft of the third drive member 450 is connected to the foundation 600. In this case, the third conducting wire 460 can be directly connected to the third drive member 450 in the base 200 without passing through the connection between the base 200 and the foundation 600, thereby reducing the difficulty of the wire routing and preventing the third conducting wire 460 from being worn.

In an embodiment, as shown in FIG. 1, FIG. 2, and FIG. 4, the main body 100 includes an air channel member 120 and a housing 130, which are connected together. The air channel member 120 surrounds and defines the blowing channel 101. The housing 130 is disposed on the side of the air channel member 120 away from the blowing channel 101. A mounting space is formed between the housing 130 and the air channel member 120. The control panel 300 includes a controller 310, which is disposed in the mounting space. In the above-described structure, the controller 310 is disposed in the mounting space to prevent external interference and to protect the controller 310.

In an embodiment, the first conducting wire 430, the third conducting wire 460, and the second conducting wire 440 are all electrically connected to the controller 310. The controller 310 can be a circuit board, and is configured to control the actuation, the rotation speed, etc. of the second drive member 410 and the third drive member 450, or to control the actuation or the rotation angle of the first drive member 420.

In an embodiment, the second conducting wire 440 is disposed in the mounting space, and the ends of the first conducting wire 430 and the third conducting wire 460 connecting with the control panel 300 are both located in the mounting space.

In an embodiment, the first drive member 420 is disposed in the mounting space, so that the first drive member 420 can be prevented from being exposed, the overall appearance can be improved, and the first drive member 420 can be protected.

In an embodiment, the main body 100 has a round annular structure. In other embodiments, the main body 100 can have a square or polygonal annular structure.

In an embodiment, as shown in FIG. 4, the housing 130 includes an upper housing 131 and a lower housing 132. The control panel 300 is disposed at the upper housing 131. In this case, the control panel 300 is located on the upper side of the housing 130, and is more convenient for observation and operation.

In an embodiment, as shown in FIG. 4, the upper housing 131 and the lower housing 132 each have a semicircular structure, and can be coupled together at the both side connections between the base 200 and the main body 100 to form an annular structure around the air channel member 120.

Figure 5:
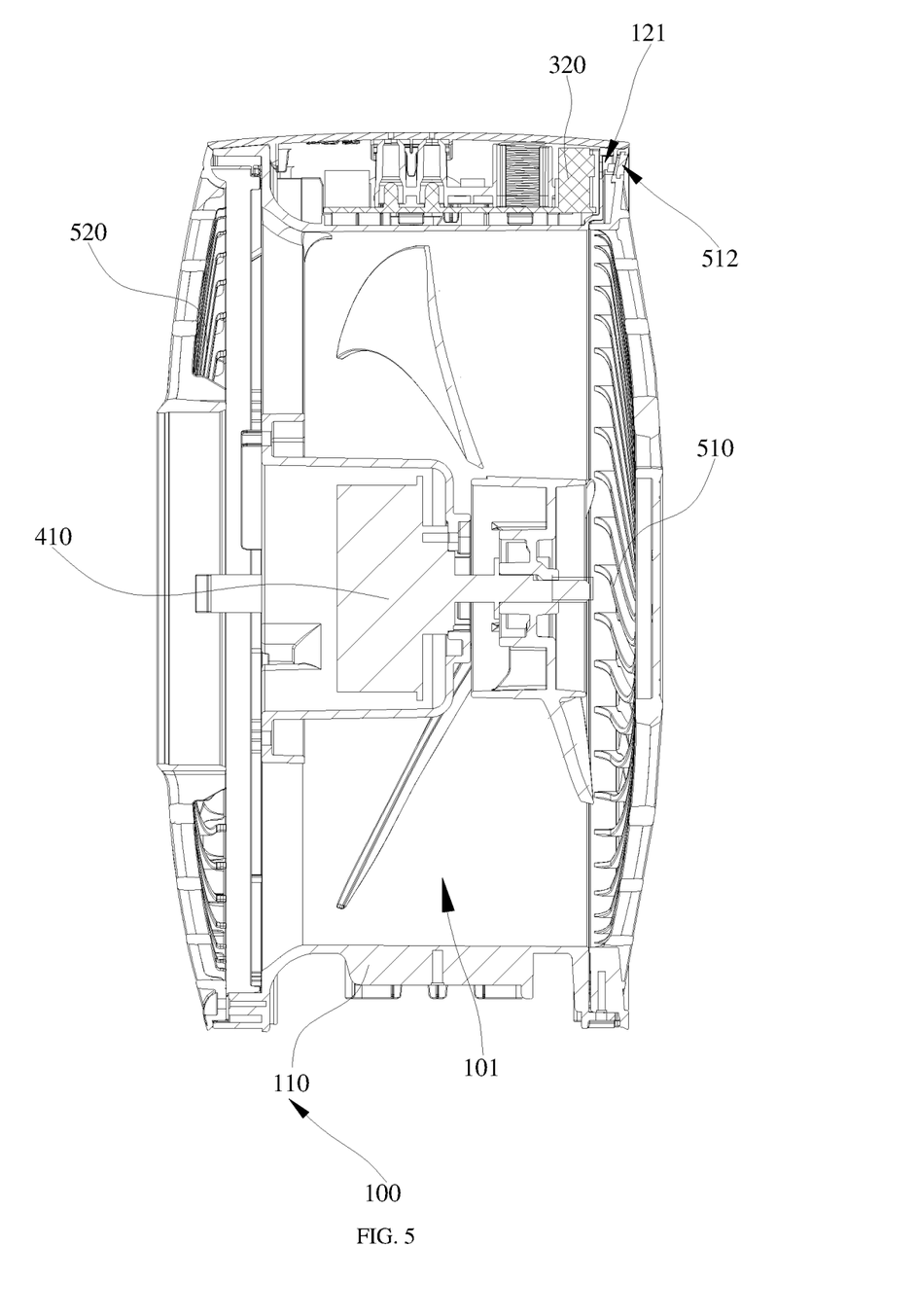
FIG. 5 is a partial sectional view of a part of the blowing structure according to an embodiment of the present disclosure.

In an embodiment, as shown in FIG. 1, FIG. 2, and FIG. 5, the control panel 300 further includes a remote control receiver 320 electrically connected to the controller 310. The housing 130 or the air channel member 120 is provided with a receiving port 121 corresponding to the remote control receiver 320. The receiving port 121 can facilitate the remote control receiver 320 to receive an external signal.

Specifically, as shown in FIG. 5, the front mesh cover is provided with a mating port 512 disposed in correspondence with the receiving port 121, so that the remote control receiver 320 is not blocked from receiving the external signal.

In an embodiment, the control panel 300 includes keys, and the housing 130 is provided with passing ports corresponding to the keys; and/or the control panel 300 includes a touch control member electrically connected to the controller 310, and the touch control member is disposed on the housing 130. The control signal can be outputted by pressing the keys or touching the touch control member, so as to adjust the function of the blowing structure.

In an embodiment, as shown in FIG. 1, FIG. 2, and FIG. 5, the control panel 300 further includes an indicator light 330 electrically connected to the controller 310, and the housing 130 is provided with a relief port corresponding to the indicator light 330; and/or the control panel 300 includes a display screen electrically connected to the controller 310, and the display screen is disposed on the housing 130. By using the indicator light 330 or the display screen, the operating state of the blowing structure can be checked.

An embodiment of a fan is disclosed. The fan includes the blowing structure according to any one of the above embodiments.

For such a fan according to the above embodiments, the control panel 300 is disposed on the main body 100 instead of on the base 200. When a user needs to operate the blowing structure, such as adjusting the function of it, and to observe the blowing structure, the user can directly operate on the control panel 300 of the main body 100. Compared with the case in which the control panel 300 is disposed on the base 200, the user does not need to bend or squat, and the operation and observation are more convenient, so that the user experience can be improved. In addition, since the control panel 300 is disposed on the main body 100, while the second drive member 410 is disposed in the setting area of the main body 100, and the first drive member 420 is connected to the main body 100, the conducting wire, which is electrically connected between the control panel 300 and either the second drive member 410 or the first drive member 420, is routed only in the main body 100, and does not need to pass through the connection between the main body 100 and the base 200, so that the length of the wire is reduced, the wire routing is simplified, and the production and assembly costs can be reduced.

In an embodiment, the fan can be a fan with blades, a blade-less fan, or other blowing devices capable of forming an airflow.

The technical features of the embodiments described above may be combined arbitrarily. For the sake of concise description, not all possible combinations of the technical features in the above-described embodiments are described. However, as long as there is no contradiction in the combinations of these technical features, the combinations should be regarded as in the scope of this specification.

What described above are only several embodiments of the present disclosure, and the illustrations thereof are relatively specific and detailed. However, it cannot be thus construed as limiting the scope of the present disclosure. It should be noted that, for those skilled in the art, on the premise of not departing from the concept of the present disclosure, it is also possible to make several modifications and improvements, which all fall into the protection scope of the present disclosure. Accordingly, the protection scope of the present disclosure should be determined by the appended claims.

In the description of the present disclosure, it is to be understood that the terms "center", "longitudinal", "transverse", "length", "width", "thickness", "upper", "lower", "front", "rear", "left", "right", "vertical", "horizontal", "top", "bottom", "inner", "outer", "clockwise", "counter-clockwise", "axial", "radial", "circumferential", etc. indicate the orientations or positional relationships on the basis of the drawings. These terms are only intended for facilitating illustrating the present disclosure and simplifying the illustration, rather than indicating or implying that the devices or elements referred thereto have to present particular orientations, and be constructed and operated in particular orientations, and therefore cannot be construed as limiting the present disclosure.

In addition, the terms "first" and "second" are only intended for illustrative purposes, rather than being construed as indicating or implying relative importance or implicitly designating the number of the technical features as indicated. Thus, the features modified by "first" and "second" may explicitly or implicitly include at least one said feature. In the illustrations of the present disclosure, the term "a plurality of" means at least two, for example two or three, unless otherwise explicitly and specifically defined.

In the present disclosure, unless otherwise expressly specified and defined, the terms "mounted", "connected to", "coupled" and "fixed" should be understood in a broad sense, for example, fixedly connected or detachably connected, or integrated; mechanically connected or electrically connected; directly connected or indirectly connected through an intermediate medium, or in an interior communication or mutual interaction relationship between two elements, unless otherwise specifically defined. For those of ordinary skill in the art, the specific meanings of the above-described terms in the present disclosure may be understood according to specific circumstances.

In the present disclosure, unless otherwise expressly stated and defined, the first feature, when being referred to as being located "above" or "below" the second feature, may be in direct contact with the second feature, or in indirect contact with the second feature via an intermediate feature. Moreover, the first feature, when being referred to as being disposed "on", "above" and "over" the second feature, may be disposed right above or obliquely above the second feature, or simply disposed at a level higher than the second feature. The first feature, when being referred to as being disposed "under", "below" and "beneath" the second feature, may be disposed directly below or obliquely below the second feature, or simply disposed at a level lower than the second feature.

It should be noted that, when an element is referred to as being "fixed to" or "disposed on" another element, it may be directly on the other element or may also be present with an intermediate element. When an element is referred to as being "connected" to another element, it may be directly connected to the other element or might be present with an intermediate element at the same time. The terms "vertical", "horizontal", "up", "down", "left", "right" and similar expressions used herein are only for the purpose of illustration, rather than presenting the only ways for implementation.

What is claimed is:

1. A blowing structure, comprising a main body, a base, a control panel, and a first drive member,
    wherein the main body is provided with a blowing channel, and the main body is rotatably connected to the base;
    wherein the main body is an annular structure surrounding the blowing channel, and the control panel is directly and partially disposed on an outer peripheral surface of the main body;
    wherein the first drive member is connected to the main body, and the first drive member is configured to adjust an angle of rotation of the main body with respect to the base;
    wherein the control panel is electrically connected to the first drive member; and
    wherein the main body comprises an air channel member and a housing, which are connected together; the air channel member surrounds and defines the blowing channel; the housing is disposed on a side of the air channel member away from the blowing channel; a mounting space is formed between the housing and the air channel member; the control panel comprises a controller, and the controller is disposed in the mounting space.

2. The blowing structure according to claim 1, further comprising a second drive member, wherein the second drive member is disposed in the blowing channel, and the control panel is electrically connected to the second drive member.

3. The blowing structure according to claim 2, further comprising:
    a first conducting wire, two ends of the first conducting wire being electrically connected to the second drive member and the control panel, respectively;
    a supporting member disposed between the second drive member and an inner wall of the main body defining the blowing channel, two ends of the supporting member being connected to the second drive member and the inner wall of the main body defining the blowing channel, respectively; and a wire routing channel defined in the supporting member, the first conducting wire extending through the wire routing channel.

4. The blowing structure according to claim 3, further comprising a second conducting wire, wherein two ends of the second conducting wire are electrically connected to the first drive member and the control panel, respectively, and the first conducting wire and the second conducting wire are disposed on two sides of the control panel, respectively.

5. The blowing structure according to claim 3, further comprising a guide groove and/or a buckle body disposed in the main body to fix the first conducting wire.

6. The blowing structure according to claim 2, further comprising a front guard and a rear guard, disposed at an air inlet and an air outlet of the blowing channel, respectively, wherein the front guard is provided with a first air vent, the rear guard is provided with a second air vent, and a shape of the first air vent matches a shape of the second air vent.

7. The blowing structure according to claim 6, further comprising a connecting member disposed between the second drive member and an inner wall of the blowing channel, wherein the connecting member matches the shape of the first air vent or the second air vent.

8. The blowing structure according to claim 7, wherein the connecting member is spiral-shaped.

9. The blowing structure according to claim 1, further comprising a third drive member and a foundation, wherein the base is rotatably coupled with the foundation, and the third drive member is configured to drive the base to rotate relative to the foundation.

10. The blowing structure according to claim 9, further comprising a third conducting wire, wherein a wire passing channel is defined at a connection between the base and the main body, the third conducting wire extends through the wire passing channel, one end of the third conducting wire is arranged in the main body and electrically connected to the control panel, and another end of the third conducting wire is arranged in the base and electrically connected to the third drive member.

11. The blowing structure according to claim 10, wherein the base comprises a first sub-body and a second sub-body spaced from each other; the first sub-body and the second sub-body are rotatably connected to two sides of the main body, respectively; the first drive member is disposed between the first sub-body and the main body; and the wire passing channel is disposed at a connection between the second sub-body and the main body.

12. The blowing structure according to claim 11, further comprising a first adapter and a second adapter, wherein the first adapter is connected to the main body; the second adapter is connected to the second sub-body; the second adapter passes through the first adapter and is rotatably coupled with the first adapter; and the wire passing channel is located in the second adapter.

13. The blowing structure according to claim 11, further comprising a third adapter and a fourth adapter, wherein the fourth adapter is connected to the first sub-body; the fourth adapter passes through the third adapter and is rotatably coupled with the third adapter; the third adapter is connected to the first drive member; the first drive member is connected to the main body; and an output shaft of the first drive member is connected to the fourth adapter.

14. The blowing structure according to claim 9, wherein the third drive member is disposed in an end of the base adjacent to the foundation, and an output shaft of the third drive member is connected to the foundation.

15. The blowing structure according to claim 1, wherein the housing comprises an upper housing and a lower housing, and the control panel is disposed at the upper housing.

16. The blowing structure according to claim 15, wherein the control panel further comprises a remote control receiver electrically connected to the controller, and the housing or the air channel member is provided with a receiving port corresponding to the remote control receiver.

17. The blowing structure according to claim 1, wherein the control panel comprises a key, and the housing is provided with a passing port corresponding to the key.

18. The blowing structure according to claim 1, wherein the control panel comprises a key, and the housing is provided with a passing port corresponding to the key; and the control panel further comprises a touch control member electrically connected to the controller, and the touch control member is disposed on the housing.

19. A fan, comprising the blowing structure according to claim 1.

20. A blowing structure, comprising a main body, a base, a control panel, and a first drive member, wherein the main body is provided with a blowing channel, and the main body is rotatably connected to the base;

wherein the main body is an annular structure surrounding the blowing channel, and the control panel is directly and partially disposed on an outer peripheral surface of the main body;

wherein the first drive member is connected to the main body, and the first drive member is configured to adjust an angle of rotation of the main body with respect to the base;

wherein the control panel is electrically connected to the first drive member;

wherein the blowing structure further comprises a third drive member and a foundation, wherein the base is rotatably coupled with the foundation, and the third drive member is configured to drive the base to rotate relative to the foundation;

wherein the blowing structure further comprises a third conducting wire, wherein a wire passing channel is defined at a connection between the base and the main body, the third conducting wire extends through the wire passing channel, one end of the third conducting wire is arranged in the main body and electrically connected to the control panel, and another end of the third conducting wire is arranged in the base and electrically connected to the third drive member;

wherein the base comprises a first sub-body and a second sub-body spaced from each other; the first sub-body and the second sub-body are rotatably connected to two sides of the main body, respectively; the first drive member is disposed between the first sub-body and the main body; and the wire passing channel is disposed at a connection between the second sub-body and the main body;

wherein the blowing structure further comprises a first adapter and a second adapter, and wherein the first adapter is connected to the main body; the second adapter is connected to the second sub-body; the second adapter passes through the first adapter and is rotatably coupled with the first adapter; and the wire passing channel is located in the second adapter.

\* \* \* \* \*